May 17, 1932.     W. W. EDWARDS     1,858,889
CHANGE SPEED MECHANISM
Filed June 1, 1931

Inventor
William W. Edwards.
By R. S. Burry
Attorney

Patented May 17, 1932

1,858,889

UNITED STATES PATENT OFFICE

WILLIAM W. EDWARDS, OF LOS ANGELES, CALIFORNIA

CHANGE SPEED MECHANISM

Continuation of application Serial No. 413,243, filed December 11, 1929. This application filed June 1, 1931. Serial No. 541,236.

This invention relates to a change-speed mechanism and more particularly pertains to a variable-speed drive for drill presses; this application being a continuation of an application filed December 11, 1929, Serial Number 413,243.

An object of the invention is to provide a change-speed transmission mechanism whereby a wide range of different speeds may be imparted to a driven member from a prime mover, in which manually operable means are provided for effecting change of the driving speed so formed and arranged as to permit ready selection of the various changes of speed.

Another object is to provide a selective change-speed mechanism embodying a multiplicity of change-speed transmission elements with a manual control of few parts which are easily operated and are not liable to get out of order.

Another object is to provide a change-speed transmission mechanism including a counter-shaft, a driven shaft and a series of power-transmitting sprocket wheels on the counter-shaft connected by sprocket chains to companion sprocket wheels on the driven shaft in which manually operable key means are provided whereby any one set of the sprocket wheels may be selectively operatively connected to the shafts independent of the other sets of sprocket wheels and whereby rotation of the drive shaft will effect rotation of only one set of the sprocket wheels at a time while the remaining sets of sprocket wheels remain stationary thus effecting an economy in power consumption, and obviating all possibility of the transmission becoming jammed.

Another object is to provide a construction in a transmission mechanism of the above character whereby key connection between the wheels and the shafts may be readily effected irrespective of variation in the relative positions of the wheels of the several sets thereof, so as to obviate any necessity of power driving of the counter-shaft in order to bring about such connection.

A further object is to provide a means for placing the counter-shaft out of operative connection with a source of power which is manually operable to turn the counter-shaft in effecting key connection between the counter shaft and any of the transmission wheels thereon.

With the foregoing objects in view, together with such other objects and advantages as may subsequently appear, the invention resides in the parts and in the combination, construction and arrangement of parts hereinafter described and claimed and illustrated by way of example in the accompanying drawings, in which:

Figure 1:
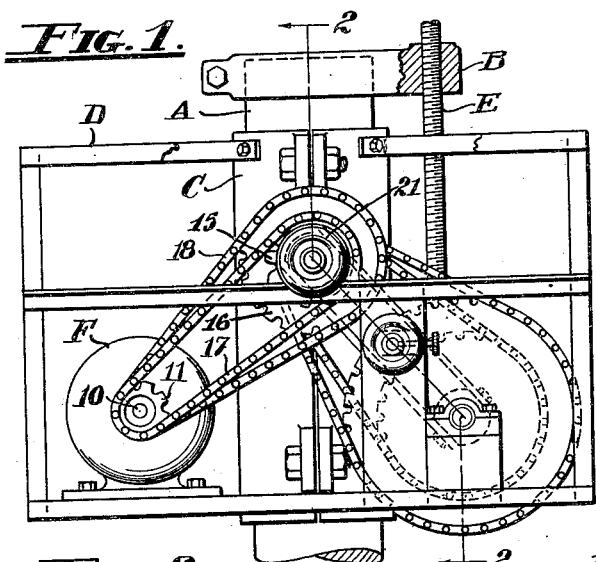
Figure 1 is a view of the change-speed mechanism as seen in front elevation with parts broken away.

Referring to the drawings more specifically, A indicates the standard of a drill press which is fitted with a cap B, and on which is mounted for vertical slidable movement a sleeve C carrying a frame D on which is mounted a change-speed mechanism and a source of power for operating a drilling mechanism; the sleeve C being raised and lowered on the standard A through the medium of a vertical screw E threaded in the cap B and adapted to be driven by mechanism (not shown) on the frame D.

The source of power carried on the frame D comprises a two-speed electric motor F, preferably a 50 and 60 cycle motor operable at speeds of either 1000 R. P. M. or 1200 R. P. M. The motor F has the usual drive shaft 10 on which is fixedly mounted a pair of corresponding sprocket pinions 11 and 12. A counter-shaft G is revolubly mounted in bearings 13 and 14 carried by the frame D and the sleeve C respectively, which shaft is arranged on a plane above the drive shaft 10 and extends in parallel relation thereto, and loosely mounted on the outer end portion of the counter-shaft G is a pair of sprocket wheels 15 and 16 disposed in alignment with the pinions 11 and 12 respectively; the wheels 15 and 16 being of different diameters. A sprocket chain 17 passes around and engages the pinion 11 and wheel 15 and a sprocket chain 18 passes around and engages the pinion 12 and wheel gear 16.

Means are provided for effecting interconnection between either of the wheels 15 and 16 and the counter-shaft G, which means embodies an annular slide H encompassing the outer end portion of the counter-shaft G and slidable longitudinally thereon, and also includes a bar 19 arranged in a longitudinal channel 20 formed in the counter-shaft G. The outer end portion of the counter-shaft G projects beyond the bearing 13 and has affixed to its end a knob 21 between which and the bearing 13 the slide H is mounted, which knob serves as a hand hold for effecting manual rotation of the counter-shaft.

The channel 20 extends lengthwise of the counter-shaft G from a point adjacent the knob 21 to a point beyond the portion of the counter-shaft encircled by the hubs of the wheels 15 and 16, which hubs are formed with keyways 22 and 23 of a width corresponding to the width of the channel 20 and adapted to be aligned therewith. The bar 19 is formed at its inner end with an upward projection constituting a key 24 which is adapted to be positioned in engagement with either the keyway 22 or keyway 23 of the wheels 15 and 16. The outer end of the bar 19 is formed with a lug 25 which is normally engaged in a channel 26 formed interiorly of the slide H; the slide being formed of a pair of annular plates 27 and 28 which are secured together by screws 29 and on adjacent faces of which are formed recesses to constitute the channel 26. The slide H is thus constructed to permit ready formation of the channel 26 and to facilitate its assemblage on the counter-shaft in engagement with the lug 25.

Interposed between the bar 19 and the bottom of the channel 20 is a bowed plate spring 30 the ends of which are seated on the bottom of the channel and the intermediate portion of which bears against the underside of the bar 19 and is affixed to the latter as by riveting. The spring 30 acts to normally maintain the bar 19 in an outermost position with the key 24 engaged with either the keyway 22 or 23 and with the lug 25 engaging the channel 26 on the slide H. The spring 30, however, is adapted to be depressed to permit retraction of the key 24 into the channel 20 as will be later described.

Extending parallel to the counter-shaft G is a driven shaft I which is disposed on a plane below the counter-shaft G; the driven shaft being supported at its outer end on a bearing 33 carried by the frame D and has its inner end portion mounted in suitable bearings, not shown. The driven shaft I constitutes a drill impeller and accordingly has its inner end suitably connected in driving relation to a drill in a conventional manner by means not necessary to be here shown.

Figure 3:
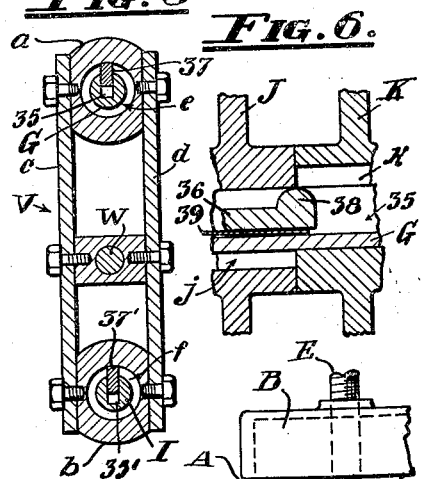
Figure 3 is a detail in cross section as seen on the line 3—3 of Figure 2.

Loosely mounted on the counter-shaft G is a series of sprocket wheels J, K, L and M; the wheels J, K and L being preferably of corresponding diameters while the wheel M is of a larger diameter. Loosely mounted on the driven shaft I is a series of sprocket wheels N, O, P and Q arranged in alignment with the wheels J, K, L and M respectively which wheels N, O, P and Q are of decreasing diameters in the order specified. Sprocket chains J, S, T and U pass around and engage respectively the wheels J and N, K and O, L and P and M and Q. Means are provided for selectively interconnecting either of the sets of wheels J, K, L, M, N, O, P and Q with the counter-shaft G and the driven shaft I whereby the latter may be rotated at various speeds from and relatively to the counter-shaft G. This means is here shown as embodying a slide V, particularly shown in Figure 3, which is carried on the counter-shaft G and driven shaft I and is mounted to slide longitudinally thereon. The slide V comprises a pair of sleeves $a$ and $b$ which are slidably mounted on the counter-shaft G and the driven shaft I respectively, and are connected together by tie-bars $c$ and $d$.

Affixed to the slide V intermediate the ends thereof is a bar W which extends parallel with the shafts G and I through a guide bearing 40 and has its outer end projecting forward of the frame D fitted with a knob 41. The bar W is formed with a series of spaced sockets 42 and mounted in the bearing 40 is a spring-pressed detent 44 adapted to be engaged with either of the sockets 42 to hold the bar W against longitudinal movement in any one of several longitudinally adjusted positions.

The shafts G and I are formed with longitudinally extending channels 35 and 35' respectively which extend along the portions of the shafts encompassed by the hubs of the wheels thereon and along portions of the shafts extending forward of the wheels, and mounted in the channels 35 and 35' are bars 36 and 36' adapted to be shifted longitudinally of the channels; the outer ends of the bars 36 and 36' being formed with lugs 37 and 37' which project into annular channels $e$ and $f$ formed interiorly of the sleeves $a$ and $b$ of the slide V whereby on moving the latter the bars 36 and 36' will be moved therewith.

The hubs of the wheels J, K, L, M, N, O, P and Q are formed with keyways $j$, $k$, $l$, $m$, $n$, $o$, $p$ and $q$ respectively, which correspond in width to and are adapted to be aligned with the channels 26 on the shafts G and I, and the inner ends of the bars 36 and 36' are formed with keys 38 and 38' which are adapted to be positioned in engagement with the keyways; the key 38 on the bar 36 carried by the counter-shaft G being adapted to be engaged with any one of the keyways $j$, $k$, $l$ and $m$, and the key 38' on the bar 36' carried by the driven shaft I being adapted to be engaged with any one of the keyways $n$, $o$, $p$ and $q$. The keys 38 and 38' are spaced equi-distant from the sleeves $a$ and $b$ so as to lie on a common plane whereby they are disposed to be engaged with the opposed pairs of wheels, or to be positioned neutrally intermediate the adjacent pairs of wheels.

Spring 39 and 39' are arranged to bear between the under sides of the bars 36 and 36' and the bottoms of the channels 35 and 35' and act to normally maintain the bars 36 and 36' in their outermost positions so that the keys 38 and 38' thereon may be engaged with the keyways under pressure of the springs 39 and 39', yet permit recession of the bars 36 and 36' into the channels when necessary to retract the keys thereon into the channels.

In the operation of the invention, setting the motor F in operation effects rotation of the shaft 10, the pinions 11 and 12, the sprocket chains 17 and 18, and the wheels 15 and 16, and rotation of the counter-shaft G will be effected either from the wheel 15 or the wheel 16 according to whether the key 24 on the bar 19 is disposed in engagement with the keyway 22 on the wheel 15 or the keyway 23 on the wheel 16. The counter-shaft G may thus be driven at either of four speeds, two of which are controlled by the wheel 15 and the two speeds of the motor and the other two of which are controlled by the wheel 16 and the two speeds of the motor; the counter-shaft being driven at slow speed by connecting the wheel 15 therewith and operating the motor at its low speed, and being driven at a faster speed by operating the motor at its high speed while the wheel 15 is in operative connection with the counter-shaft. The counter-shaft is rotated at its highest speed by operatively connecting the wheel 16 therewith and operating the motor at its high speed, and may be operated at its third speed by operating the motor at slow speed while the wheel 16 is operatively connected to the counter-shaft. Operation of the motor at its two speeds is governed by the usual switch and the two-speed construction of the motor, not necessary to be here shown as the same is well known in the art. To effect operative connection of either the wheel 15 or 16 with the counter-shaft G the slide H is manually shifted longitudinally of the counter-shaft thereby causing the bar 19 to advance therewith and move the key 24 either into engagement with the wheel 15 or the wheel 16 as the case may be.

It will be understood that by reason of the difference in diameters of the wheels 15 and 16, the keyways 22 and 23 therein will seldom if ever be disposed in accurate alignment with each other, so that the ends of the keyways at the contiguous faces of the wheel hubs will be closed by wall portions of the adjacent hubs, and accordingly when the bar 19 is shifted to move the key 24 thereon out of engagement with one of the keyways the key will be engaged by the adjacent hub and will be depressed into the channel 20 so as to then be held out of engagement with either of the keyways first by one hub then by the other when the key is disposed intermediate the wheels. It follows that by moving the slide H to an intermediate position the key 24 will be disposed in a neutral position so that rotation of the wheels 15 and 16 will not be transmitted to the counter-shaft and the latter will then remain at rest until the key is moved to a position clear of one of the hubs and within the boundaries of the other so that on rotation of the latter the key thereon will be moved to a position to be engaged by the key.

It will now be seen that as the wheels 15 and 16 are loose on the counter-shaft G and are driven continuously from the motor, the free wheel may be disposed with its keyway out of register with the channel 20 in the counter-shaft, and that in this event, in shifting the bar 19 from one of its wheel-engaging positions to the other the key 24 will, on advancing against the end of the hub of either of the wheels, be depressed by reason of the end faces of the key being inclined and also by reason of the bar 19 being movable inwardly. The key 24 may thus be disposed between the ends of the hub of the wheel while out of alignment with the keyway therein, and if the wheels are revolving during this operation the key will then ride into engagement with the keyway. In event shifting of the key is effected while the wheels 15 and 16 are stationary the key may be moved into engagement with the keyway by manually turning the countershaft through the medium of the knob 21.

This permits of the interconnection between either of the wheels 15 and 16 and the counter-shaft being made while the power drive is off so as to obviate the impact on the key connection which would occur in effecting speed change while the motor is in operation.

Figure 6:
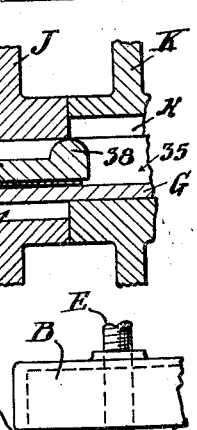
Figure 6 is a detail in longitudinal section of a fragmentary portion of the counter-shaft showing the key connection in a neutral position.

In like manner the keys 38 and 38' on the bars 36 and 36' are cooperable with the keyways and hubs of the wheels on the shaft G and I on reciprocation of the bars 36 and 36'; that is when the slide V is disposed to position the keys 38 and 38' at an intermediate position to be overlapped by the end portions of the hubs of contiguous wheels, as shown in Figure 6, the keys will be held out of operative relation to the wheels so that the counter-shaft may then be rotated without effecting rotation of any of the transmission wheels J, K, L and M and consequently these wheels together with their encompaning chains and the companion wheels on the driven shaft will then be stationary.

When it is desired to effect connection between the counter-shaft and any one of the wheels J, K, L and M thereon, the slide V is shifted, while the counter-shaft is stationary, to dispose the key 38 in a position between the ends of the hub of the selected wheel J, K, L, or M, whereupon the counter-shaft is manually turned by the knob 21 to bring the key 38 opposite the keyway in the selected wheel whereupon the key will be caused to enter the keyway under the urge of the spring 39. Movement of the slide V will at the same time effect positioning of the key 38' between the ends of the hub of the wheel N, O, P, or Q paired with the selected wheel J, K, L, or M, so that on rotation of the counter-shaft as above described, which will effect rotation of the selected wheel, its encompassing chain and its companion wheel, the key 38' will be caused to engage the keyway of such companion wheel under the urge of the spring 39'.

On impelling the counter-shaft the driven shaft I will be rotated at a speed according to which of the wheels N, O, P and Q is operatively connected therewith which, in turn, is determined by the position of the key 38' on the bar 36' which is, in turn, determined by the position of the slide V and its connected bar W; the latter being disposed in a desired position by the operator shifting it longitudinally in the bearing 40.

Figure 2:
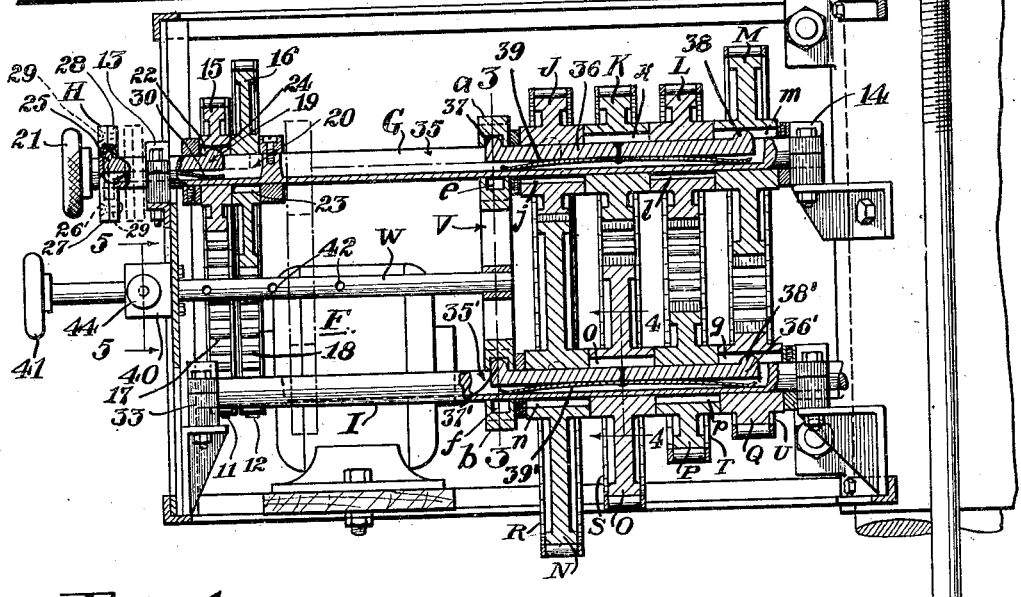
Figure 2 is a view of the change-speed mechanism as seen in side elevation with portions removed and illustrating parts thereof in vertical section on the line 2—2 of Figure 1.
Figure 4:
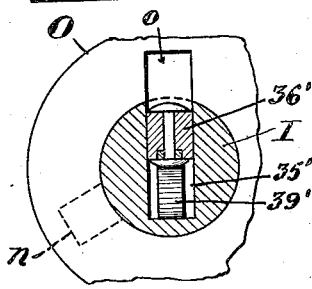
Figure 4 is a view in section and elevation as seen on the line 4—4 of Figure 2.
Figure 5:
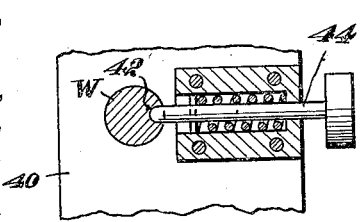
Figure 5 is a detail in cross section taken on the line 5—5 of Figure 2.

The series of sockets 42 in the outer end portions of the bar W serves to indicate to the operator the particular wheels J, K, L, M, N, O, P or Q engaged by the keys 38—38'; the sockets 42 being spaced apart on centers distances corresponding to the spacing of the longitudinal centers of the wheels on the shafts G and I and being arranged relatively thereto and to the detent 44 that when the latter is engaged, for example, with the outer socket 42, as shown in Figure 2, the keys 38 and 38' will be in operative engagement with the wheels M and Q and by advancing the bar W to dispose the other sockets 42 in engagment with the detent 44, the keys 38 and 38' will be advanced successively into operative relation with the wheels L—P, K—S, and J—N. The keys 38 and 38' have their end faces inclined and the bars 36 and 36' may be depressed into the channels 35 and 35' in order to permit the key to move into position between the ends of the hubs of the several wheels in event the keyways thereon are disposed out of alignment with the channels 35 and 35' in the manner previously described with reference to the key 24.

The shaft I will be rotated at a speed which will vary according to which of the wheels N, O, P and Q is operatively connected therewith; the wheels N, O, P and Q being of progressively decreasing diameters. The shaft I may thus be rotated at four speeds from the counter-shaft G and the latter being operable at either of four speeds gives a range of 16 speeds to the driven shaft I. Obviously the range of the speeds of the shaft I may be increased by increasing the number of transmission connections between the driven shaft and the counter-shaft and between the counter-shaft and the motor-driven shaft.

By the arrangement here shown I have produced a change-speed driving mechanism for a drill press which, with a motor operable at either 1000 or 1200 R. P. M's a drill driven from the shaft I may be revolved at speeds ranging from 80 to 1000 R. P. M's through the range of sixteen speed changes.

I claim:

In a change-speed mechanism, a counter-shaft, a driven shaft, a series of sets of sprocket wheels loosely revoluble on each of said shafts, a sprocket chain interconnecting each set of said wheels, each of said wheels being formed with a keyway extending longitudinally of and contiguous the wheel-carrying shafts, the keyways of adjacent wheels being normally disposed out of alignment with each other, a sleeve on each of said shafts slidable longitudinally thereof, a manually operable slide bar, a connection between said slide bar and each of said sleeves so that reciprocation of said slide bar will effect corresponding movement of each of said sleeves, a retractable spring-pressed key carried by each of said shafts slidable longitudinally thereof, connections between said keys and said sleeves for causing said keys to collectively advance lengthwise of said shafts on effection movement of said sleeves to dispose said keys in position to be engaged with the keyways of companion pairs of said wheels, a knob fixed on said counter-shaft manually turnable to rotate said counter-shaft to dispose the key carried thereby in a position to cause it to be engaged with a keyway on one of the wheels, and means for power driving said counter-shaft at variable speeds including manually operable means for placing said counter-shaft in neutral.

WILLIAM W. EDWARDS.